US012676743B2

(12) United States Patent
Sarker et al.

(10) Patent No.: US 12,676,743 B2
(45) Date of Patent: Jul. 7, 2026

(54) METHODS AND APPARATUSES FOR PROVIDING COMMUNICATION BETWEEN A SERVER AND A CLIENT DEVICE VIA A PROXY NODE

(71) Applicant: Telefonaktiebolaget LM Ericsson (publ), Stockholm (SE)

(72) Inventors: Zaheduzzaman Sarker, Järfälla (SE); Attila Mihály, Dunakeszi (HU); Marcus Ihlar, Älvsjö (SE); Mirja Kuehlewind, Ludwigsburg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 549 days.

(21) Appl. No.: 18/029,069

(22) PCT Filed: Sep. 29, 2020

(86) PCT No.: PCT/EP2020/077235
§ 371 (c)(1),
(2) Date: Mar. 28, 2023

(87) PCT Pub. No.: WO2022/069024
PCT Pub. Date: Apr. 7, 2022

(65) Prior Publication Data
US 2023/0379150 A1 Nov. 23, 2023

(51) Int. Cl.
*H04L 9/08* (2006.01)
(52) U.S. Cl.
CPC ................................... *H04L 9/088* (2013.01)

(58) Field of Classification Search
CPC . H04L 9/088; H04L 63/0281; H04L 63/0485; H04L 63/061; H04L 69/164; H04W 12/04; H04W 12/03
See application file for complete search history.

(56) References Cited

U.S. PATENT DOCUMENTS 7,684,414 B2 * 3/2010 Durst .................... H04L 69/326
370/400
9,667,601 B2 * 5/2017 Bollay ................ H04L 63/0428
(Continued)

FOREIGN PATENT DOCUMENTS

| EP | 3522473 A1 | 8/2019 |
| WO | 2019037685 A1 | 2/2019 |
| WO | 2019120569 A1 | 6/2019 |

OTHER PUBLICATIONS

International Search Report and Written Opinion of the International Searching Authority, PCT/EP2020/077235, mailed Jun. 18, 2021, 9 pages.
(Continued)

*Primary Examiner* — Han Yang
(74) *Attorney, Agent, or Firm* — Sage Patent Group

(57) ABSTRACT

Embodiments described herein relate to methods and apparatuses for providing communication between a server and a client device via a proxy node. A method, in a proxy node, wherein the proxy node includes an intermediate node between a server and a client device includes receiving encrypted traffic transmitted between the client device and the server; receiving a key from the client device; performing a service in relation to the encrypted traffic to generate information; encrypting the information using the key to generate encrypted information; and transmitting the encrypted information to the server.

20 Claims, 13 Drawing Sheets

(56)                    References Cited

U.S. PATENT DOCUMENTS

2011/0289311  A1 *  11/2011  Roy-Chowdhury .........................
                                                                  H04L 9/0844
                                                                  713/176
2019/0268764  A1 *   8/2019  Wei ....................... H04L 9/3234

OTHER PUBLICATIONS

Written Opinion of the International Preliminary Examining Authority, PCT/EP2020/077235, mailed Aug. 24, 2022, 7 pages.
International Preliminary Report on Patentability of the International Preliminary Examining Authority, PCT/EP2020/077235, mailed Dec. 12, 2022, 19 pages.
Mihály, Attila et al., "Supporting Multi-Domain Congestion Control by a Lightweight PEP," Internet of Things, Embedded Systems and Communications (IINTEC), 2017 International Conference, IEEE, 2017, pp. 105-110.
Krämer, Zsolt et al., "Towards Multi-Domain Congestion Control in Next-Generation Networks," 2019 IEEE Wireless Communications and Networking Conference (WCNC), pp. 1-7.

* cited by examiner

601

701

702

METHODS AND APPARATUSES FOR PROVIDING COMMUNICATION BETWEEN A SERVER AND A CLIENT DEVICE VIA A PROXY NODE

CROSS REFERENCE TO RELATED APPLICATIONS

This application is a 35 U.S.C. § 371 national stage application of PCT International Application No. PCT/EP2020/077235 filed on Sep. 29, 2020, the disclosure and content of which is incorporated by reference herein in its entirety.

TECHNICAL FIELD

Embodiments described herein relate to methods and apparatuses for providing communication between a server and a client device via a proxy node. In particular, embodiments described herein provide methods for communication between the proxy node and the server when the proxy node is acting as a performance enhancing proxy.

BACKGROUND

QUIC

QUIC is a UDP (User Datagram Protocol) based stream-multiplexed and secure transport protocol. Unlike the traditional transport protocol stack with TCP (Transmission Control Protocol), which resides in the operating system kernel, QUIC can easily be implemented in user space, i.e. in the application layer. As a consequence, the use of QUIC can improve flexibility in terms of transport protocol evolution with implementation of new features, congestion control, deploy ability and adoption.

QUIC is likely to become the main transport protocol in the Internet's user plane. It is expected that most applications running today over HTTP/HTTPS will migrate to QUIC, driven by latency improvements and stronger security. Notably, compared to HTTPS, encryption in QUIC covers both the transport protocol headers as well as the payload, as opposed to Transport Layer Security (TLS) over TCP, e.g. HTTPS, which protects only the payload.

The security in QUIC is achieved by protecting both the packet headers and the payload. The QUIC payload is protected using a separate key than the key used for header protection. The payload protection uses the unencrypted packet number as input to the cryptographic algorithm. Therefore, the QUIC payload is protected using a separate key than the key is used for header protection. The key used for header protection is called the header protection key.

Proxy Node

A proxy node may be understood as an intermediary program acting as both server and client, creating or simply relaying requests on behalf of other entities. Requests are serviced internally or by passing them on, with possible translation, to other servers. There are several types of proxies, where we focus on the following:

A "transparent proxy" may comprise a proxy node that does not modify the request or response beyond what is required for proxy authentication and identification.

A "non-transparent proxy" may comprise a proxy node that modifies the request or response to provide some added service to the client device, such as group annotation services, media type transformation, protocol reduction, or anonymity filtering.

A "reverse proxy" may comprise a proxy node that effectively pretends to be the actual server (as far as any client or client proxy is concerned), but it passes on the request to the actual server that is usually sitting behind another layer of firewalls.

A "Performance Enhancement Proxy (PEP)" may comprise a proxy node that is used to improve the performance of protocols on network paths where native performance suffers due to characteristics of a link or subnetwork on the path.

Light Weight PEP (LW PEP)

One specific category of PEP is one which, sends signalling packets to the Server or to the client containing information that may be used to help improve the end-to-end performance of the ongoing sessions. Herein, this category of PEP will be referred to as cooperative PEPs (COPEs).

One example of a COPE comprises a Lightweight PEP (LW PEP).

FIG. 1 illustrates an example of a LW PEP 100 in communication with a client device 101 and a server 102. The client device 101 and the server 102 transmit data between them using the LW PEP 100 as a proxy. The LW PEP 100 is also configured to transmit safe-to-ignore ACKs and NACKs to the server 102 indicating received (or not received) packets from the server 102. This enables the server 102 to identify where the packet loss has happened and to adapt its congestion control accordingly. The LW PEP approach requires minimal processing or storage, adds no delay to the communication and does not require any client update.

Other examples of such on-path COPEs are possible, such as COPEs that are configured to send early congestion notification (ECN) messages to the Server, or some other characteristics of the proxy node to client device path, e.g. available bandwidth indications or other access network specific information.

5G Reference Architecture

FIG. 2 illustrates the 5G reference architecture as defined by 3GPP.

The relevant architectural aspect for embodiments described herein is the UPF (User Plane Function), The User Plane function (UPF) supports handling of user plane traffic based on the rules received from the Session Management Function (SMF), specifically, for embodiments described herein, packet inspection and different enforcement actions such as traffic steering, QoS, charging, etc.

Collaborative Performance Enhancement (COPE) Node or Function

As previously described, a Collaborative Performance Enhancement (COPE) node or function is an entity which resides between two endpoints, usually in a client and server setup but also in a peer to peer communication setup, that uses encrypted communication. The communicating parties (usually the client) explicitly contact the COPE node in order to request a network-support service. This service at a minimum may include forwarding of the encrypted traffic to a specific server, e.g. in cases where the server is otherwise not directly reachable. In addition, the endpoints can share traffic information with the COPE entity such that the COPE entity can execute a requested performance enhancement function to improve the Quality of Service (QoS) of the traffic as well as optimize operations within the network. Additionally or alternatively, the COPE node can provide additional information about the network which enables the endpoint to optimize its data transfer, e.g. use a more optimized congestion control or delay pre-fetching activities.

Usually, it is expected that a client learns about the existence of a COPE service either directly from the access network or by other communication with a peer. When a COPE node is detected, the client can open a connection to it (for example a QUIC connection when QUIC is used as a transport protocol) and request a service. The communication with the server is realized by an inner transport connection that is encrypted end-to-end between the client and the server.

FIG. 3 illustrates a typical connection between a COPE node 300, a client device 301 and a server 302. The client device may be connected to the cope node over the radio access network. The COPE node 300 may for example be implemented with the UPF in the core network.

FIG. 4 illustrates a typical placement of COPE node in the mobile network. As illustrates, the COPE node 300 is connected to the client devices 301*a* and 301*b* via the radio access network, for example the base station 400.

SUMMARY

According to some embodiments there is provided a method, in a proxy node, wherein the proxy node comprises an intermediate node between a server and a client device. The method comprises receiving encrypted traffic transmitted between the client device and the server; receiving a key from the client device; performing a service in relation to the encrypted traffic to generate information; encrypting the information using the key to generate encrypted information; and transmitting the encrypted information to the server.

According to some embodiments there is provided a method, in a client device, wherein the client device is in communication with a server via a proxy node. The method comprises communicating encrypted traffic between the client device and the server via the proxy node; and transmitting a key to the proxy node for use in transmitting, to the server, information resulting from a service performed by the proxy node.

According to some embodiments there is provided a method, in a server, wherein the server is in communication with a client device via a proxy node. The method comprises communicating encrypted traffic between the client device and the server via the proxy node; and receiving, information resulting from a service performed by the proxy node wherein the information is encrypted using a key, wherein the key comprises one of: a header protection key used to encrypt headers in the encrypted traffic and a key generated by the server for use by the proxy node.

According to some embodiments there is provided a proxy node, wherein the proxy node comprises an intermediate node between a server and a client device. The proxy node comprises processing circuitry configured to receive encrypted traffic transmitted between the client device and the server; receive a key from the client device; perform a service in relation to the encrypted traffic to generate information; encrypt the information using the key to generate encrypted information; and transmit the encrypted information to the server.

According to some embodiments there is provided a client device, wherein the client device is in communication with a server via a proxy node. The client device comprises processing circuitry configured to communicate encrypted traffic between the client device and the server via the proxy node; and transmit a key to the proxy node for use in transmitting, to the server, information resulting from a service performed by the proxy node.

According to some embodiments there is provided a server, wherein the server is in communication with a client device via a proxy node. The server comprises processing circuitry configured to communicate encrypted traffic between the client device and the server via the proxy node; and receive, information resulting from a service performed by the proxy node wherein the information is encrypted using a key, wherein the key comprises one of: a header protection key used to encrypt headers in the encrypted traffic and a key generated by the server for use by the proxy node.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
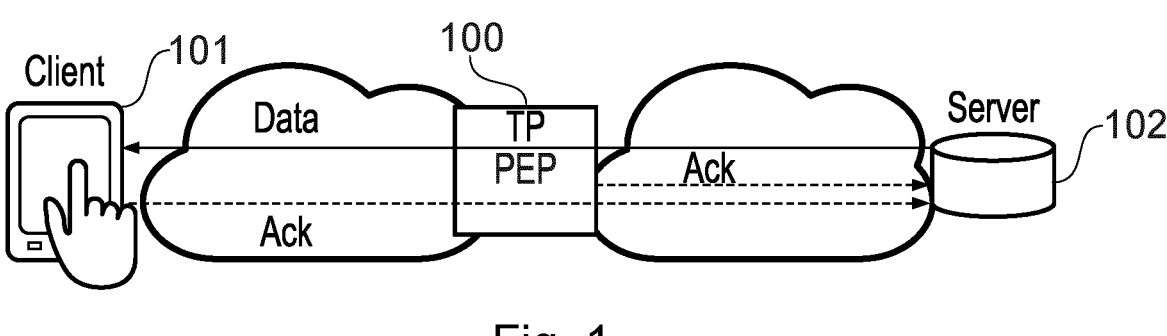
FIG. 1 illustrates an example of a LW PEP in communication with a client device and a server.
Figure 2:
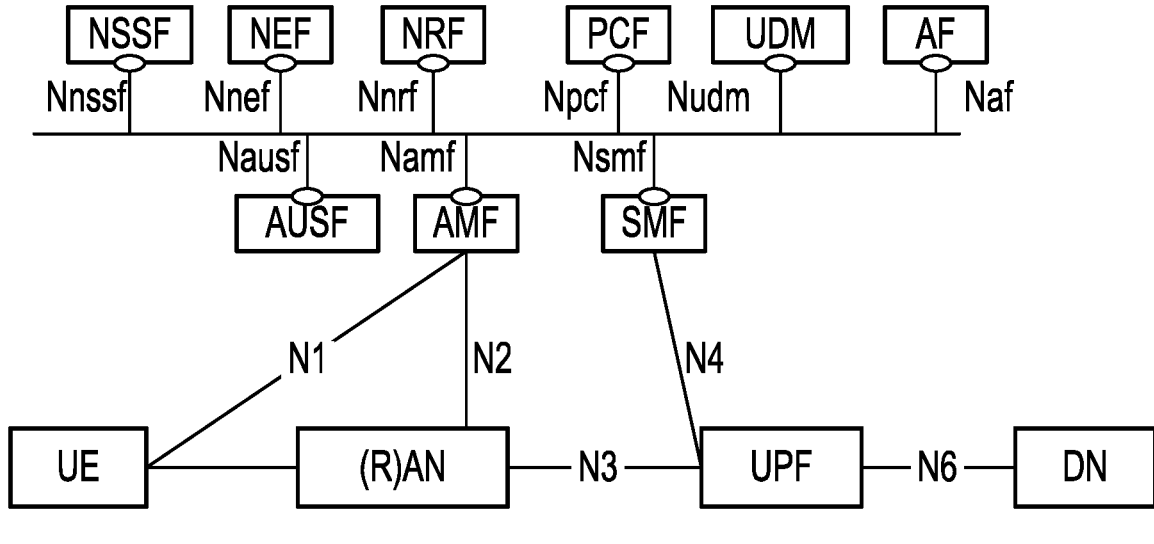
FIG. 2 illustrates the 5G reference architecture as defined by 3GPP.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Ubiquitous encryption has become the norm for Internet communication. Therefore, it may be desirable for the information sent by a COPE to a server to also be encrypted to provide both integrity of the information sent to the server as well as to authenticate the COPE. To maintain a lightweight nature of such communication (in order to ensure that there is not a high burden on the network to provide such encryption), solutions that do not require additional secure connection setup to the Server may be preferred.

For example, sending back parts of the encrypted downlink packets to the server may be useful to prove the fact that the COPE 'seen' those packets, but this cannot authenticate the COPE itself, and thus cannot protect against amplification attacks.

Besides this security issue, it may also be useful to ensure that the COPE in on-path (to be able to e.g., report on the downlink packets seen from the server) and also to negotiate the COPE functionality that is needed by the server.

Embodiments described herein relate to methods and apparatuses configured to transmit encrypted information from a proxy node to a server related to traffic being transmitted via the proxy node between a client device and the server.

Embodiments described herein make use of the Client to proxy node control channel to convey the necessary information: for example, the offer of the PEP service from the proxy node to the server, the server consent, and any encryption keys to use. In some embodiments, the uplink Header Protection Key used for the client device to server communication is also used to encrypt the information generated by the PEP service to be sent to the server.

Figure 3:
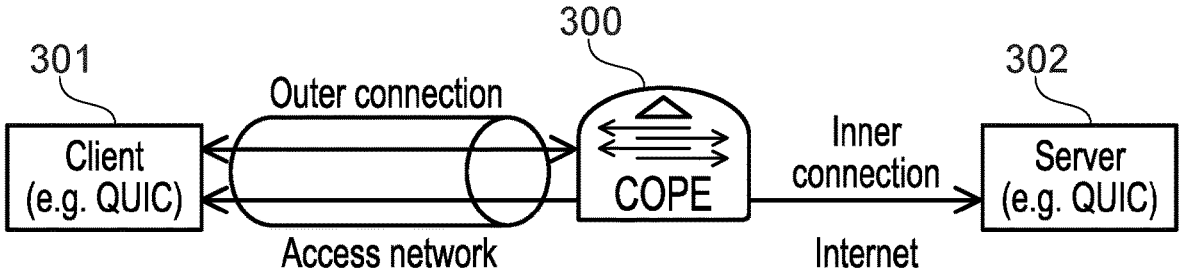
FIG. 3 illustrates a typical connection between a COPE node, a client device and a server.
Figure 4:
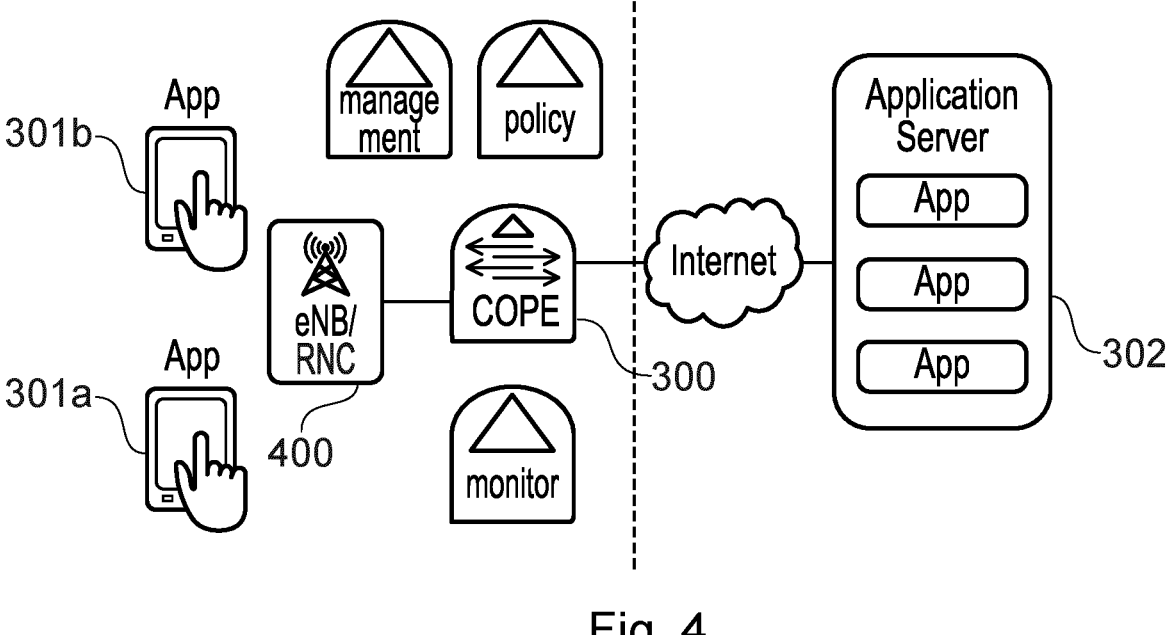
FIG. 4 illustrates a typical placement of COPE node in the mobile network.
Figure 5:
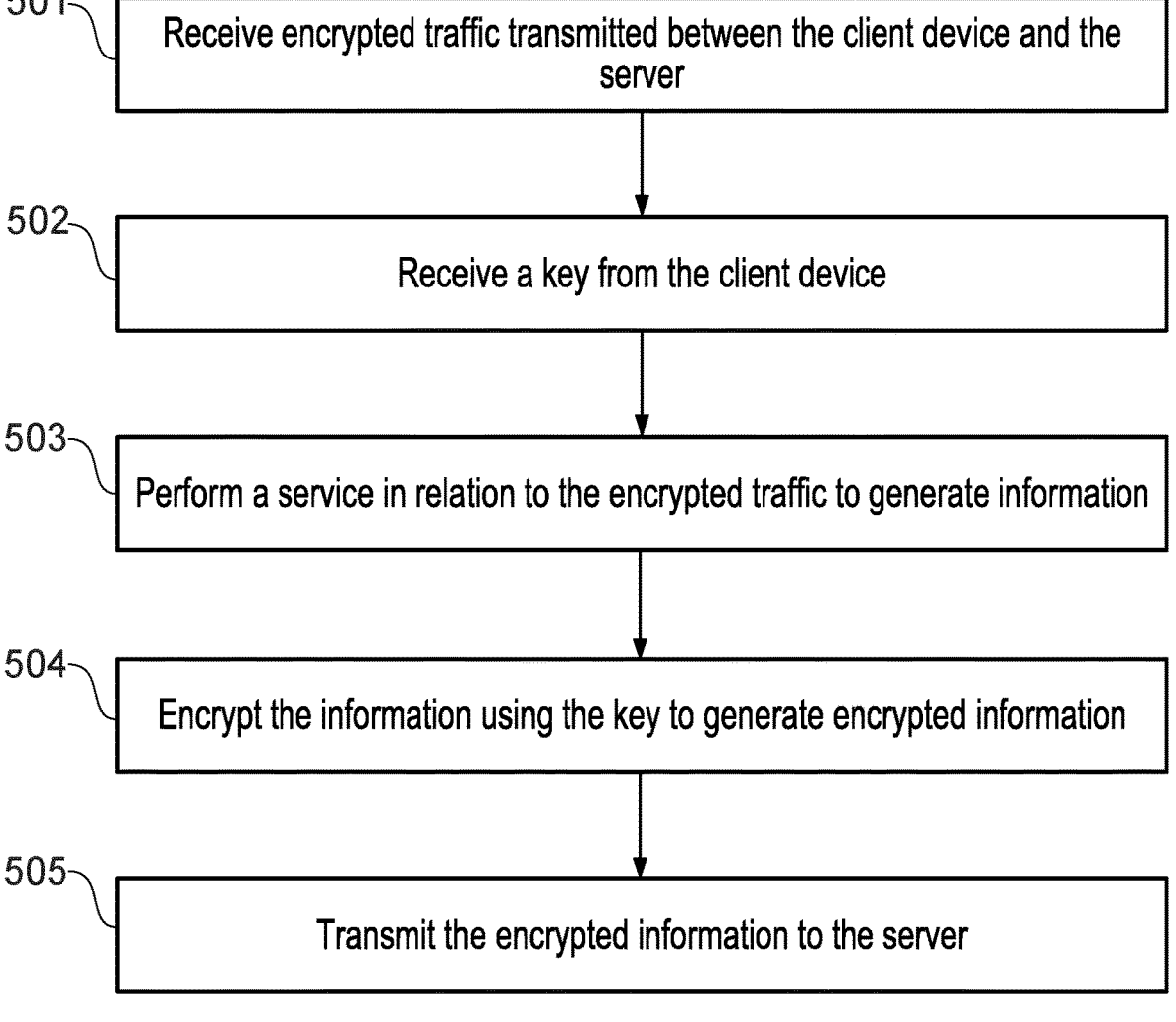
FIG. 5 illustrates a method, in a proxy node, wherein the proxy node comprises an intermediate node between a server and a client device.

FIG. 5 illustrates a method, in a proxy node, wherein the proxy node comprises an intermediate node between a server and a client device. It will be appreciated that the proxy node may comprise a COPE node as described above. The proxy node may for example, be implemented in a UPF in the core network. The proxy node may comprise a proxy node 300 as illustrated in FIGS. 3 and 4.

It will be appreciated that the proxy node may be on-path, for example, at least for the downlink traffic. For example, the downlink Server packets towards the client device may be transmitted via the proxy node. The proxy node may also be on-path for the uplink direction. In some examples, the proxy node may be embedded into the UPF, which is the anchor point for the client devices (e.g. user equipments (UEs)).

For a stand-alone proxy node, the client device may transmit the uplink packets to the proxy node first, and the proxy node may in turn forward the uplink packets to the server, for example using the server's source IP address and port.

It may be desirable in some examples to ensure that the packets transmitted by the COPE reach the server (assuming there could be load balancers towards the Server). It may also be desirable for the server to be able to relate the COPE packets to the end-to-end connection between the server and the client device. For QUIC, both of these aims are fulfilled if the uplink Connection ID used by the COPE is the same as the uplink connection ID used by the Client. This also means that every time when the Connection ID changes, it may be useful for the client device to notify the COPE about the new Connection ID.

For some examples, it may be desirable if the COPE does not delay the communication between the client device and the server. This may be achieved by mirroring the original downlink packets (by e.g., the UPF). The 1-RTT connection setup may also be fulfilled if the Client setup is sent over the connection between the client device and the COPE with the service request.

In step 501, the proxy node receives encrypted traffic transmitted between the client device and the server. For example, the encrypted traffic may be transmitted from the client device to the server, from the server to the client device, or both.

For example, the proxy node may receive a connection request from the client device to act as a proxy between the client device and the server. In some examples, the connection request further comprises a request for access to a service. In some other examples, the request for access to the service may be received separately from the connection request.

The service may be a service performed by the proxy node in relation to the encrypted traffic. For example, the service may be a Performance Enhancing Proxy (PEP) service implemented to attempt to enhance the performance of the communication between the client device and the server.

The service may comprise a lightweight (LW) PEP service. For example, the service may comprise alerting the server as to which packet sequence numbers have been received at the proxy node. This allows the server to distinguish, in response to a packet loss signal from the client device, whether the packet loss occurred on the server to proxy node path or the proxy node to client path. The server may then implement different congestion control mechanisms in response to the two different options.

It will be appreciated that the service performed by the proxy node may comprise any suitable service relating to the encrypted traffic. For example, the service may comprise transmitting early congestion notification (ECN) messages to the server, or some other indication of characteristics of the proxy node to client device path, e.g. available bandwidth indications.

In step 502, the proxy node receives a key from the client device. For example, the key may be received as part of a request to perform the service. The receipt of the key at the proxy node may therefore make use of the existing the client device to proxy node control channel. In some examples, as described later with reference to FIG. 8, the key comprises a header protection key used to encrypt headers in the encrypted traffic.

In some examples, as described later with reference to FIGS. 9 and 10, the key comprises a key generated by the server for use by the proxy node.

In step 503, the proxy node performs the service in relation to the encrypted traffic to generate information.

For example, the service may comprise decrypting one or more packet headers in the encrypted traffic using a header protection key; and determining packet sequence numbers of the one or more packet headers. The information may then comprise an indication of which packet sequence numbers are in the packet headers of the encrypted traffic. The header protection key may be received from the client device.

In examples in which the header protection key is not transmitted to the proxy node, the proxy node may instead extract the packet headers from the encrypted traffic. The information may then comprise the extracted packet headers.

In step 504, the proxy node encrypts the information using the key to generate encrypted information.

In some examples, as described previously the key comprises the header protection key. However, even when the proxy node is aware of the header protection key, a different key may be utilized to encrypt the information.

In step 505, the proxy node transmits the encrypted information to the server.

Figure 6:
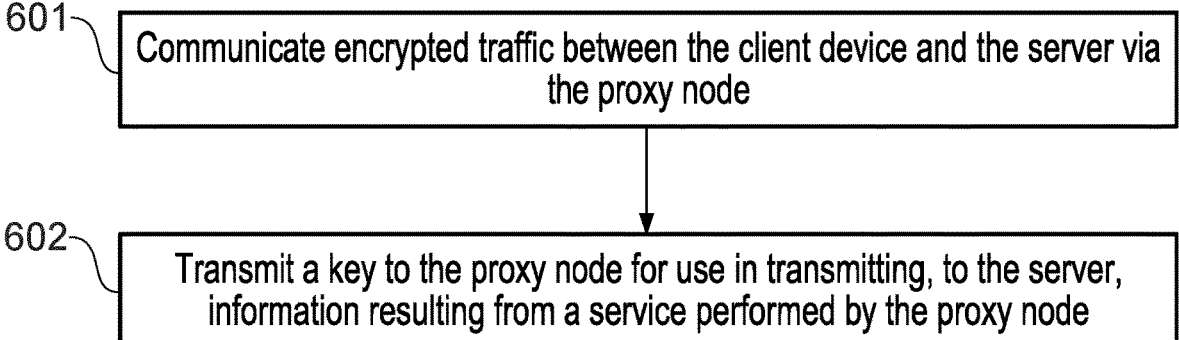
FIG. 6 illustrates a method in a client device wherein the client device is in communication with a server via a proxy node.

FIG. 6 illustrates a method in a client device wherein the client device is in communication with a server via a proxy node. The proxy node may perform the method as described with reference to FIG. 5 above.

In step 601, the client device communicates encrypted traffic between the client device and the server via the proxy node. For example, the encrypted traffic may be transmitted from the client device to the server, from the server to the client device, or both.

In step 602, the client device transmits a key to the proxy node for use in transmitting, to the server, information resulting from a service performed by the proxy node. As described above, the key may comprise a header protection key used to encrypt headers in the encrypted traffic. The header protection key may have been separately negotiated by the client device and the server.

The key may alternatively comprise a key generated by the server for use by the proxy node. If the key is generated by the server, the client device may receive the key from the server in response to transmitting an indication to the server that the service is supported on the path between the server and the client device.

The client device may first transmit a connection request to the proxy node to request that the proxy node act as a proxy between the client device and the server. In some examples, the connection request further comprises a request for access to the service. In some examples, the request for access to the service is transmitted separately to the connection request. Responsive to the request for access to the service, the client device may receive an indication that the proxy node supports the service. Responsive to the indication that the proxy node supports the service, the client device may transmit an indication to the server that the service is supported on the path between the server and the client device, as described above.

In some examples, the key is transmitted as part of a request to perform the service.

Figure 7:
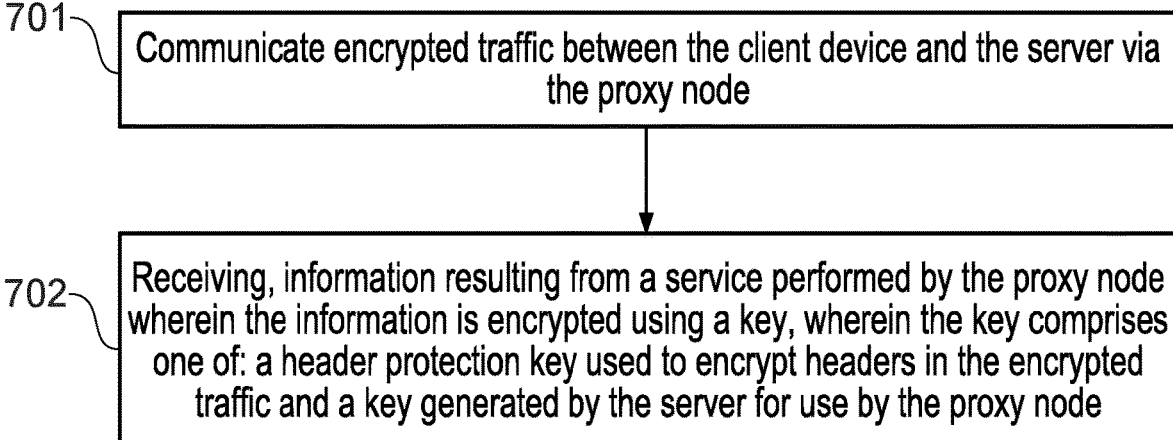
FIG. 7 illustrates a method, in a server, wherein the server is in communication with a client device via a proxy node.

FIG. 7 illustrates a method, in a server, wherein the server is in communication with a client device via a proxy node. The proxy node may perform the method as described above with reference to FIG. 5, and the client device may perform the method as described above with reference to FIG. 6.

In step 701, the server communicates encrypted traffic between the client device and the server via the proxy node. For example, the encrypted traffic may be transmitted from the client device to the server, from the server to the client device, or both.

In step 702, the server receives information resulting from a service performed by the proxy node wherein the information is encrypted using a key, wherein the key comprises one of: a header protection key used to encrypt headers in the encrypted traffic and a key generated by the server for use by the proxy node.

In embodiments in which the key is generated by the server for use by the proxy node, the server may be configured to generate the key for use by the proxy node; and transmit the key to the client device. In some example, the server may be configured to generate the key responsive to receiving an indication from the client device that the service is supported on the path between the client device and the server.

As described above, the encrypted information may comprise an indication of a packet headers received by the proxy node in the encrypted traffic.

Figure 8:
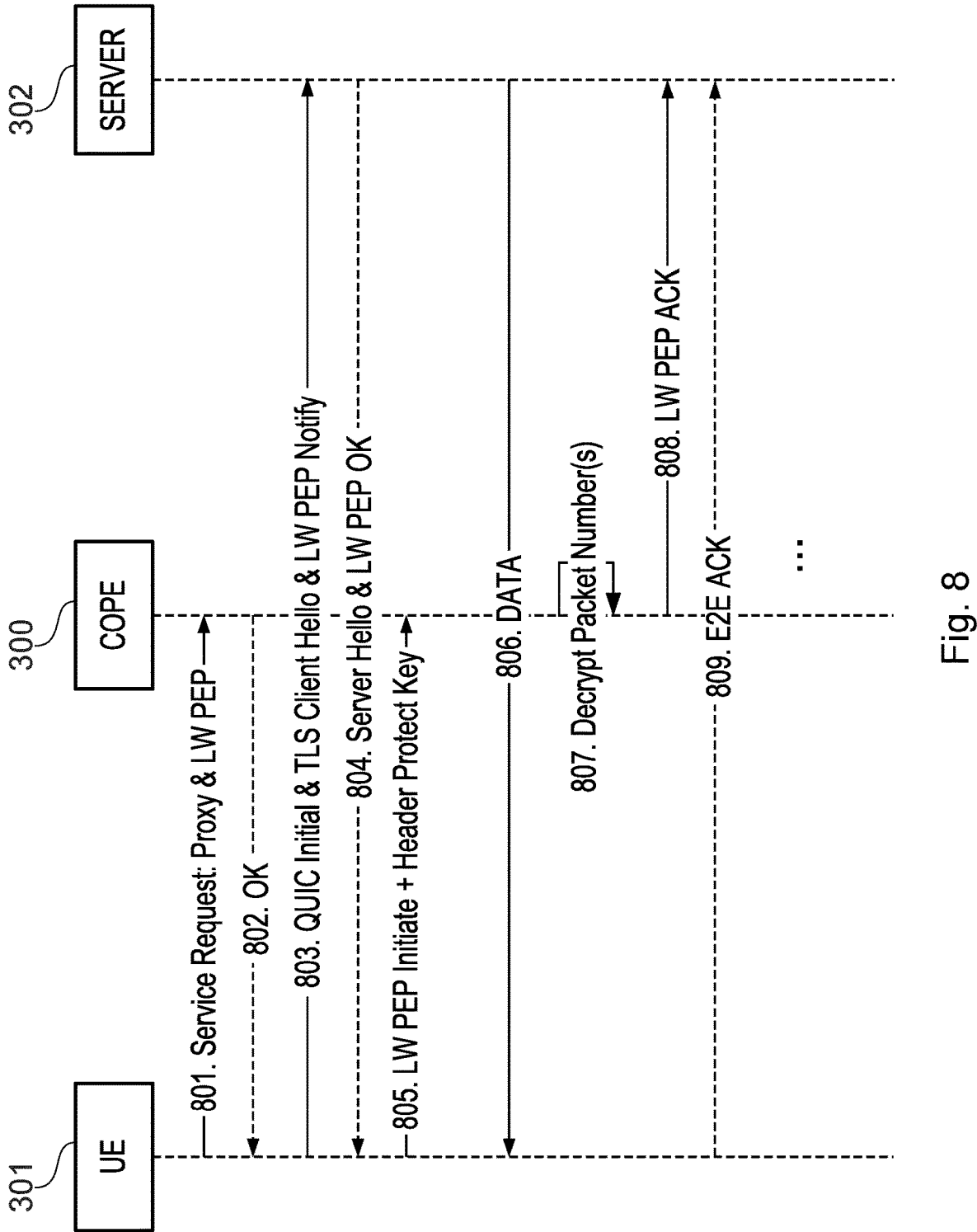
FIG. 8 illustrates an example implementation of the methods of FIGS. 5 to 7 in which the key used to encrypt the information transmitted by the proxy node comprises a header protection key.
Figure 9:
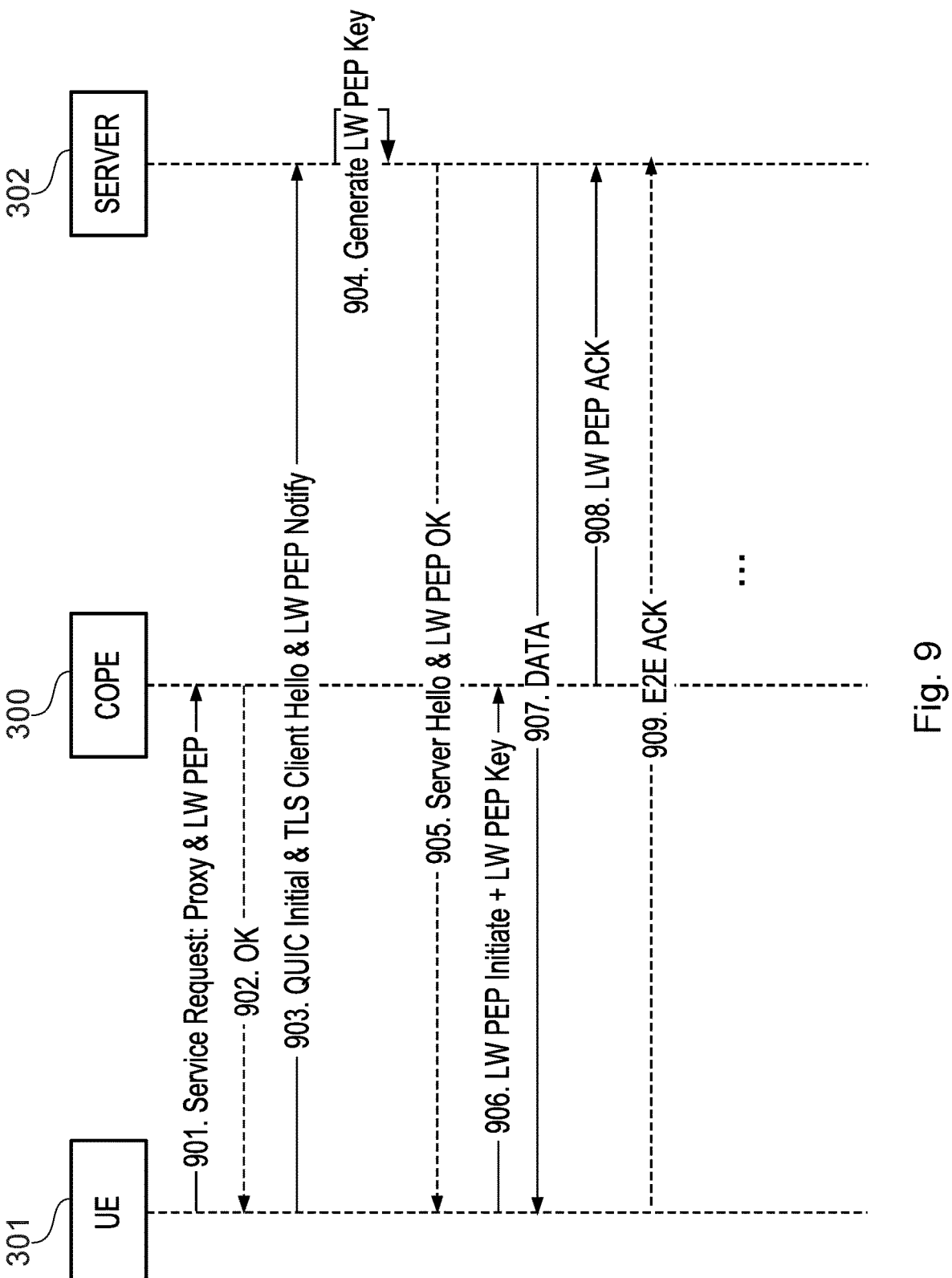
FIG. 9 illustrates an example implementation of the methods of FIGS. 5 to 7 in which the key used to encrypt the information transmitted by the proxy node comprises a key generated by the server.
Figure 10:
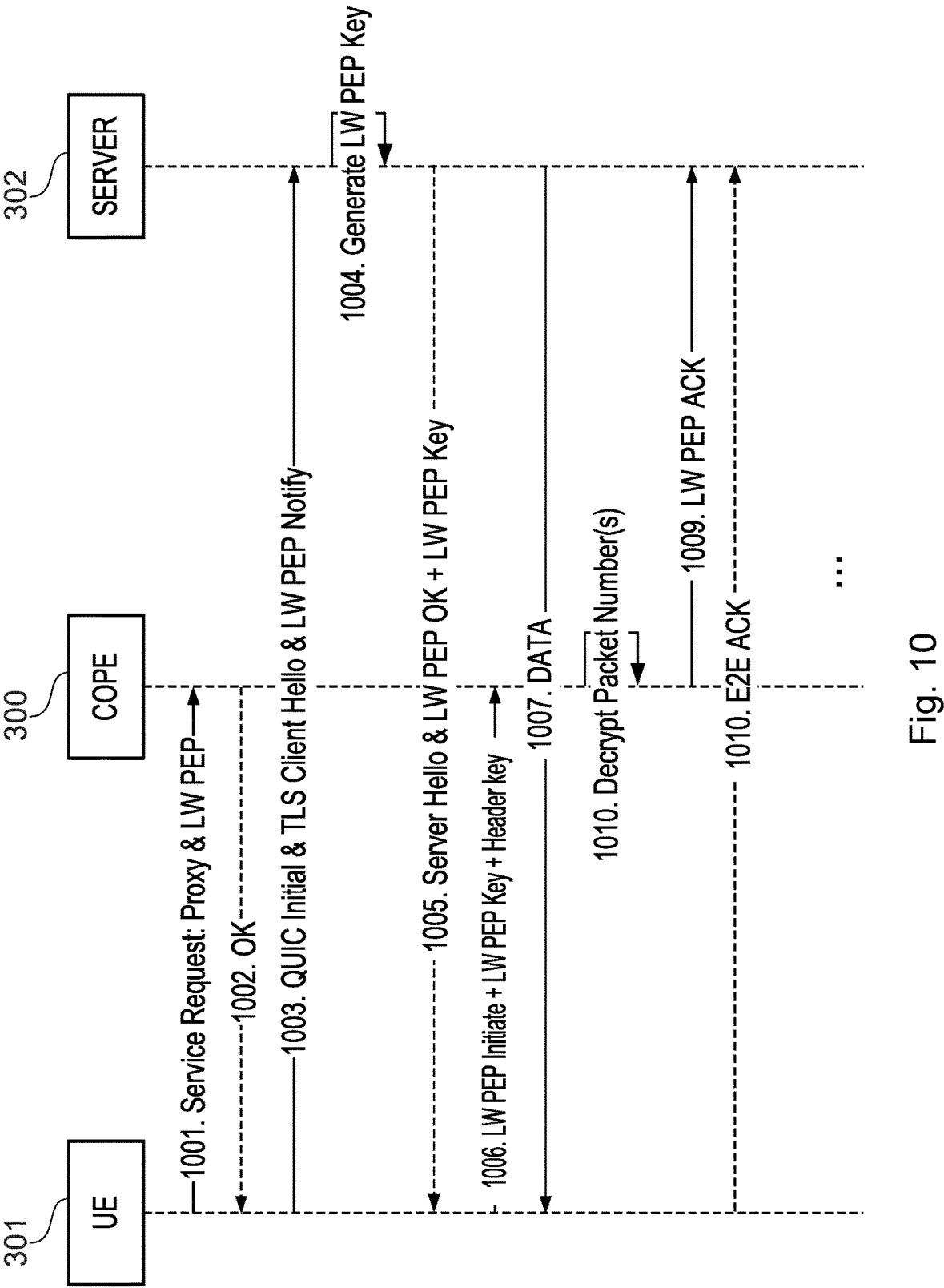
FIG. 10 illustrates an example implementation of the methods of FIGS. 5 to 7 in which the key used to encrypt the information transmitted by the proxy node comprises a key generated by the server.

FIGS. 8 to 10 illustrates example embodiments in which the service provided is a LW PEP service. In other words, in which the information provided by the proxy node to the server comprises an indication of one or more packet headers received in the encrypted traffic. The indication may comprise packet sequence numbers of the packet headers themselves. It will however, be appreciated that any suitable PEP service may be provided by the proxy node.

FIG. 8 illustrates an example implementation of the methods of FIGS. 5 to 7 in which the key used to encrypt the information transmitted by the proxy node 300 comprises a header protection key. Utilizing the header protection key in this way allows for the possibility of generating delayed Ack/Nack similarly to the TCP/QUIC delayed ack function. This results in less packets sent to the server with well controlled additional delay. This use of the header protection key also simplifies key management as no new key is needed for communication with the proxy node. The header protection key may also be sent to the proxy node without additional Server-Client communication so there is no need to change the current end-to-end communication protocols.

In step 801, the client device 301 transmits a connection request to connect to the proxy node 300. In this example, the connection request comprises a request for access to the service, in this example a LW PEP service. As an alternative, the client device 301 may only request the proxy service in this step, and the proxy node may transmit a Promise message following the request for a proxy service indicating the PEP services available to the proxy node In step 802, the proxy node 300 acknowledges the request and indicates that both the proxy service and the LW PEP service are available.

In step 803, the client device 300 connects to server via the proxy node and indicates support for on path LW PEP service.

In step 804, the server 302 finishes the handshake and indicates that it has support for LW PEP messages.

In step 805, the client device 301 sends a request to perform the LW PEP service to the proxy node 300. In this example, the request to perform the LW PEP service comprises the Header Protection Key used by the client device 301 and the server the encrypt packet headers in their communication.

In step 806, the server 302 transmits encrypted traffic to the client device 301.

In step 807, the proxy node 300 performs the LW PEP service. For example, the proxy node 300 decrypts the one or more packet headers sent towards client device by the server 302 and generates information indicative of the packet sequence numbers of the decrypted packet headers.

In step 808, the proxy node 300 encrypts the information generated in step 807 using the header protection key. In examples in which Lightweight PEP functionality is used then the original transport protocol (e.g., QUIC) Ack frame format can be reused by the proxy node 300. The server may be able to distinguish the packets received from the proxy node 300 from the uplink packets received from the client device 301, for example, based on the source address/port of the proxy node 300, by introducing a new QUIC packet type attribute, or by having a specific signalling number in the packets received from the proxy node 300.

In step 809, the client device 301 sends acknowledgements of received packets. This acknowledgement may comprise an indication of the packet sequence numbers received in packet headers at the client device 301.

FIG. 9 illustrates an example implementation of the methods of FIGS. 5 to 7 in which the key used to encrypt the information transmitted by the proxy node 300 comprises a key generated by the server 302. This may be advantageous when separate cryptographic context is desired for the proxy node to server communication.

In step 901, the client device 301 transmits a connection request to connect to the proxy node 300. In this example, the connection request comprises a request for access to the service, in this example a LW PEP service. As an alternative, the client device 301 may only request the proxy service in this step, and the proxy node may transmit a Promise message following the request for a proxy service indicating the PEP services available to the proxy node In step 902, the proxy node 300 acknowledges the request and indicates that both the proxy service and the LW PEP service are available.

In step 903, the client device 300 connects to server via the proxy node and indicates support for on path LW PEP service.

In step 904, the server 302, in response to the indication received in step 903, generates a key for use by the proxy node in performance of the LW PEP service.

In step 905, the server 302 finishes the handshake and indicates that it has support for LW PEP messages. In this example, the server also includes the key generated in step 904 in this signalling.

In step 906, the client device 301 sends a request to perform the LW PEP service to the proxy node 300. In this example, the request to perform the LW PEP service comprises the key generated by the server.

In step 907, the server 302 transmits encrypted traffic to the client device 301.

In step 908, the proxy node 300 performs the LW PEP service. For example, the proxy node 300 may extract the packet headers from the encrypted traffic received in step 906. The proxy node 300 may then generate information comprising the extracted packet headers.

In step 909, the proxy node 300 encrypts the information generated in step 908 using the key received in step 906. The server 302 may then decrypt the encrypted information received in step 909 using the key generated in step 904. If LW PEP function is used, then the server 302 may further decrypt each packet header in the list to uncover the packet number each Ack refers to.

In step 910, the client device 301 sends acknowledgements of received packets. This acknowledgement may comprise an indication of the packet sequence numbers received in packet headers at the client device 301.

FIG. 10 illustrates an example implementation of the methods of FIGS. 5 to 7 in which the key used to encrypt the information transmitted by the proxy node 300 comprises a key generated by the server 302. In this example however, the client device also sends the header encryption key to the proxy node. This allows the proxy node to provide optimized acknowledgements in the provision of the LW PEP service, whilst also providing a separate cryptographic context for the proxy node to server communication.

In step 1001, the client device 301 transmits a connection request to connect to the proxy node 300. In this example, the connection request comprises a request for access to the service, in this example a LW PEP service. As an alternative, the client device 301 may only request the proxy service in this step, and the proxy node may transmit a Promise message following the request for a proxy service indicating the PEP services available to the proxy node.

In step 1002, the proxy node 300 acknowledges the request and indicates that both the proxy service and the LW PEP service are available.

In step 1003, the client device 300 connects to server via the proxy node and indicates support for on path LW PEP service.

In step 1004, the server 302, in response to the indication received in step 903, generates a key for use by the proxy node in performance of the LW PEP service.

In step 1005, the server 302 finishes the handshake and indicates that it has support for LW PEP messages. In this example, the server also includes the key generated in step 904 in this signalling.

In step 1006, the client device 301 sends a request to perform the LW PEP service to the proxy node 300. In this example, the request to perform the LW PEP service comprises the key generated by the server. In this example, the request to perform the LW PEP service further comprises the header protection key.

In step 1007, the server 302 transmits encrypted traffic to the client device 301.

In step 1008, the proxy node 300 performs the LW PEP service. For example, the proxy node 300 decrypts the one or more packet headers sent towards client device by the server 302 and generates information indicative of the packet sequence numbers of the decrypted packet headers.

In step 1009, the proxy node 300 encrypts the information generated in step 1008 using the key received in step 1006. The server 302 may then decrypt the encrypted information received in step 1009 using the key generated in step 904.

In step 1010, the client device 301 sends acknowledgements of received packets. This acknowledgement may comprise an indication of the packet sequence numbers received in packet headers at the client device 301.

Figure 11:
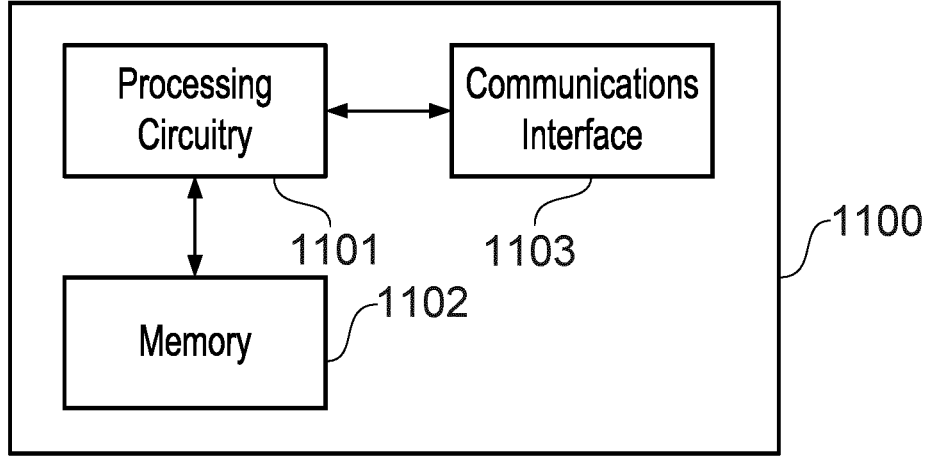
FIG. 11 illustrates a proxy node comprising processing circuitry (or logic)

FIG. 11 illustrates a proxy node 1100 comprising processing circuitry (or logic) 1101. The processing circuitry 1101 controls the operation of the proxy node 1100 and can implement the method described herein in relation to a proxy node 1100. The processing circuitry 1101 can comprise one or more processors, processing units, multi-core processors or modules that are configured or programmed to control the proxy node 1100 in the manner described herein. In particular implementations, the processing circuitry 1101 can comprise a plurality of software and/or hardware modules that are each configured to perform, or are for performing, individual or multiple steps of the method described herein in relation to the proxy node 1100.

Briefly, the processing circuitry 1101 of the proxy node 1100 is configured to: receive encrypted traffic transmitted between the client device and the server; receive a key from the client device; perform a service in relation to the encrypted traffic to generate information; encrypt the information using the key to generate encrypted information; and transmit the encrypted information to the server.

In some embodiments, the proxy node 1100 may optionally comprise a communications interface 1102. The communications interface 1102 of the proxy node 1100 can be for use in communicating with other nodes, such as other virtual nodes. For example, the communications interface 1102 of the proxy node 1100 can be configured to transmit to and/or receive from other nodes requests, resources, information, data, signals, or similar. The processing circuitry 1101 of proxy node 1100 may be configured to control the communications interface 1102 of the proxy node 1100 to transmit to and/or receive from other nodes requests, resources, information, data, signals, or similar.

Optionally, the proxy node 1100 may comprise a memory 1103. In some embodiments, the memory 1103 of the proxy node 1100 can be configured to store program code that can be executed by the processing circuitry 1101 of the proxy node 1100 to perform the method described herein in relation to the proxy node 1100. Alternatively or in addition, the memory 1103 of the proxy node 1100, can be configured to store any requests, resources, information, data, signals, or similar that are described herein. The processing circuitry 1101 of the proxy node 1100 may be configured to control the memory 1103 of the proxy node 1100 to store any requests, resources, information, data, signals, or similar that are described herein.

Figure 12:
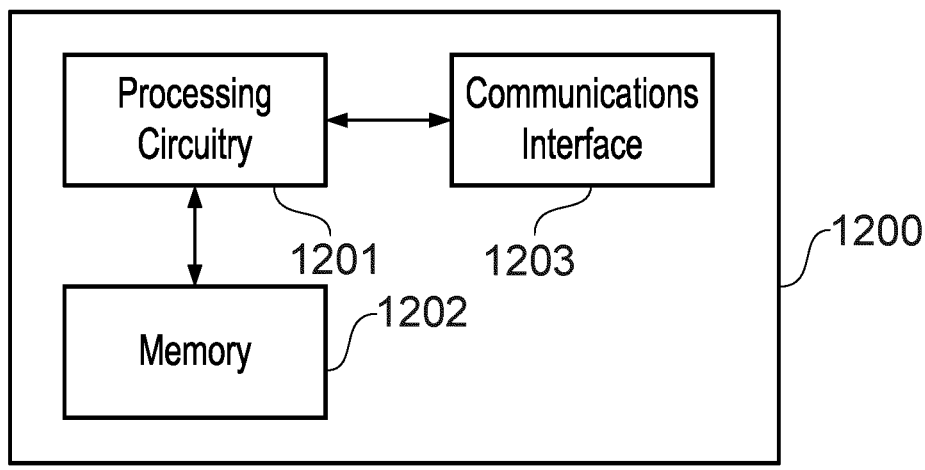
FIG. 12 illustrates a client device comprising processing circuitry (or logic)

FIG. 12 illustrates a client device 1200 comprising processing circuitry (or logic) 1201. The processing circuitry 1201 controls the operation of the client device 1200 and can implement the method described herein in relation to a client device 1200. The processing circuitry 1201 can comprise one or more processors, processing units, multi-core processors or modules that are configured or programmed to control the client device 1200 in the manner described herein. In particular implementations, the processing circuitry 1201 can comprise a plurality of software and/or hardware modules that are each configured to perform, or are for performing, individual or multiple steps of the method described herein in relation to the client device 1200.

Briefly, the processing circuitry 1201 of the client device 1200 is configured to: receive an event subscription request from a network node subscribing for information relating to the reachability of a wireless device, the event subscription request comprising an indication of a reachability type; and responsive to receiving an indication of an event indicating a change in the reachability of the wireless device via the reachability type, transmit a notification to the network node indicating the reachability of the wireless device via the reachability type.

In some embodiments, the client device 1200 may optionally comprise a communications interface 1202. The communications interface 1202 of the client device 1200 can be for use in communicating with other nodes, such as other virtual nodes. For example, the communications interface 1202 of the client device 1200 can be configured to transmit to and/or receive from other nodes requests, resources, information, data, signals, or similar. The processing circuitry 1201 of client device 1200 may be configured to control the communications interface 1202 of the client device 1200 to transmit to and/or receive from other nodes requests, resources, information, data, signals, or similar.

Optionally, the client device 1200 may comprise a memory 1203. In some embodiments, the memory 1203 of the client device 1200 can be configured to store program code that can be executed by the processing circuitry 1201 of the client device 1200 to perform the method described herein in relation to the client device 1200. Alternatively or in addition, the memory 1203 of the client device 1200, can be configured to store any requests, resources, information, data, signals, or similar that are described herein. The processing circuitry 1201 of the client device 1200 may be configured to control the memory 1203 of the client device 1200 to store any requests, resources, information, data, signals, or similar that are described herein.

Figure 13:
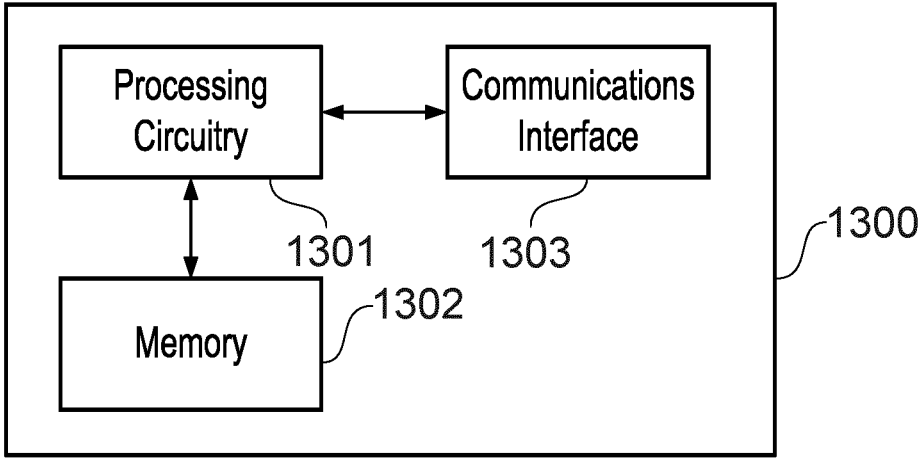
FIG. 13 illustrates a server comprising processing circuitry (or logic).

FIG. 13 illustrates a server 1300 comprising processing circuitry (or logic) 1301. The processing circuitry 1301 controls the operation of the server 1300 and can implement the method described herein in relation to a server 1300. The processing circuitry 1301 can comprise one or more processors, processing units, multi-core processors or modules that are configured or programmed to control the server 1300 in the manner described herein. In particular implementations, the processing circuitry 1301 can comprise a plurality of software and/or hardware modules that are each configured to perform, or are for performing, individual or multiple steps of the method described herein in relation to the server 1300.

Briefly, the processing circuitry 1301 of the server 1300 is configured to: communicate encrypted traffic between the client device and the server via the proxy node; and receive, information resulting from a service performed by the proxy node wherein the information is encrypted using a key, wherein the key comprises one of: a header protection key used to encrypt headers in the encrypted traffic and a key generated by the server for use by the proxy node.

In some embodiments, the server 1300 may optionally comprise a communications interface 1302. The communications interface 1302 of the server 1300 can be for use in communicating with other nodes, such as other virtual nodes. For example, the communications interface 1302 of the server 1300 can be configured to transmit to and/or receive from other nodes requests, resources, information, data, signals, or similar. The processing circuitry 1301 of server 1300 may be configured to control the communications interface 1302 of the server 1300 to transmit to and/or receive from other nodes requests, resources, information, data, signals, or similar.

Optionally, the server 1300 may comprise a memory 1303. In some embodiments, the memory 1303 of the server 1300 can be configured to store program code that can be executed by the processing circuitry 1301 of the server 1300 to perform the method described herein in relation to the server 1300. Alternatively or in addition, the memory 1303 of the server 1300, can be configured to store any requests, resources, information, data, signals, or similar that are described herein. The processing circuitry 1301 of the server 1300 may be configured to control the memory 1303 of the server 1300 to store any requests, resources, information, data, signals, or similar that are described herein.

Embodiments described herein may therefore provide improved transport protocol performance e.g., through a multi-domain congestion control (e.g., separate congestion control for internet and radio domain run at the server that provides fairness in the Internet domain, and fast, efficient adaptation in radio domain). In other words, as the server 302 may be aware through the LW PEP service, which packets are lost in the server to Proxy node connection, and which are lost in the proxy node to client device connection, the congestion control may be tailored to suit which connection is suffering from packet loss.

A benefit of the LW PEP service is lower complexity (buffering, processing, encryption) requirements compared to a PEP that splits the end-to-end connection between the client device and the server.

The proxy node of embodiments described herein may also have little or no impact on the end-to-end delays of the communication between the client device and the server. For example, the proxy node may deploy an optical splitter for the received packets to both process the packets to provide the PEP service, and forward them at the same time.

Embodiments described herein also do not require two layers of encryption to ensure privacy of the end-to-end communication between the client device and the server.

In embodiments described herein, the congestion control may be kept within the server, where it has the best place to align with the application needs.

In embodiments described herein, the negotiation of provision of the PEP service provided by the proxy node involves all parties, and allows consent or opting out. For example, without server consent for using PEP service the PEP service is not unnecessarily switched on. Furthermore, by providing security by encrypting the information transmitted by the proxy node to the server, issues like multiplication attacks are avoided.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a proxy node, wherein the proxy node comprises an intermediate node between a server and a client device; the method comprising:
    receiving encrypted traffic transmitted between the client device and the server;
    receiving a key from the client device;
    performing a service with respect to the encrypted traffic to generate information;
    encrypting the information using the key to generate encrypted information; and
    transmitting the encrypted information to the server; and
    forwarding the encrypted traffic to the server or the client device.

2. The method of claim 1 further comprising:
    receiving a connection request from the client device to act as a proxy between the client device and the server.

3. The method of claim 2 wherein the connection request further comprises a request for access to the service.

4. The method of claim 1 further comprising receiving a request for access to the service.

5. The method of claim 1 wherein the key is received as part of a request to perform the service.

6. The method of claim 1 wherein the key comprises a header protection key used to encrypt headers in the encrypted traffic.

7. The method of claim 1 wherein the key comprises a key generated by the server for use by the proxy node.

8. The method of claim 1, wherein the encrypted traffic is transmitted from the server to the client device, and wherein the information comprises an indication of one or more packet headers received in the encrypted traffic.

9. The method of claim 8 further comprising:
    decrypting the one or more packet headers in the encrypted traffic using a header protection key; and
    determining packet sequence numbers of the packet headers, wherein the information comprises an indication of which packet sequence numbers are in the packet headers of the encrypted traffic.

10. The method of claim 8 wherein a header protection key is received from the client device, and the method further comprising:
    decrypting the one or more packet headers in the encrypted traffic using the header protection key; and
    determining packet sequence numbers of the packet headers, wherein the information comprises an indication of which packet sequence numbers are in the packet headers of the encrypted traffic.

11. The method of claim 8 further comprising:
    extracting the packet headers from the encrypted traffic, wherein the information comprises the extracted packet headers.

12. A method, in a client device, wherein the client device is in communication with a server via a proxy node; the method comprising:
    communicating encrypted traffic between the client device and the server via the proxy node; and
    transmitting a key to the proxy node for use in encrypting and then transmitting, to the server, information produced by a service performed by the proxy node with respect to the encrypted traffic.

13. The method of claim 12 further comprising:
    transmitting a connection request to the proxy node to request that the proxy node act as a proxy between the client device and the server.

14. The method of claim 13 wherein the connection request further comprises a request for access to the service.

15. The method of claim 13 wherein the key is transmitted as part of a request to perform the service.

16. The method of claim 13 wherein the key comprises a header protection key used to encrypt headers in the encrypted traffic.

17. The method of claim 13 wherein the key comprises a key generated by the server for use by the proxy node.

18. The method of claim 12 further comprising transmitting a request for access to the service.

19. A method, in a server, wherein the server is in communication with a client device via a proxy node; the method comprising:
    communicating encrypted traffic between the client device and the server via the proxy node; and receiving, information produced by a service performed by the proxy node wherein the information is encrypted using a key, wherein the key comprises one of: a header protection key used to encrypt headers in the encrypted traffic and a key generated by the server for use by the proxy node.

20. The method of claim 19 further comprising:

generating the key for use by the proxy node; and transmitting the key to the client device.

* * * * *